United States Patent
Okuyama et al.

(10) Patent No.: US 8,652,356 B2
(45) Date of Patent: *Feb. 18, 2014

(54) BLUE PHOSPHOR, AND LIGHT-EMITTING DEVICE USING THE SAME

(75) Inventors: Kojiro Okuyama, Nara (JP); Yayoi Okui, Osaka (JP); Seigo Shiraishi, Osaka (JP)

(73) Assignee: Panasonic Corporation, Osaka (JP)

(*) Notice: Subject to any disclaimer, the term of this patent is extended or adjusted under 35 U.S.C. 154(b) by 666 days.

This patent is subject to a terminal disclaimer.

(21) Appl. No.: 12/675,919

(22) PCT Filed: Jul. 3, 2009

(86) PCT No.: PCT/JP2009/003104
§ 371 (c)(1),
(2), (4) Date: Mar. 1, 2010

(87) PCT Pub. No.: WO2010/001624
PCT Pub. Date: Jan. 7, 2010

(65) Prior Publication Data
US 2010/0237765 A1   Sep. 23, 2010

(30) Foreign Application Priority Data
Jul. 3, 2008  (JP) .................................. 2008-174336

(51) Int. Cl.
*C09K 11/80* (2006.01)
(52) U.S. Cl.
USPC .................................... 252/301.4 R; 313/587
(58) Field of Classification Search
USPC ............................. 313/582–587; 252/301.4 R
See application file for complete search history.

(56) References Cited

U.S. PATENT DOCUMENTS

| 6,254,805 | B1 | 7/2001 | Potter |
| 7,014,792 | B2 | 3/2006 | Raukas et al. |
| 7,300,605 | B2 | 11/2007 | Fukuta et al. |
| 8,040,063 | B2 * | 10/2011 | Okuyama et al. ............. 313/582 |
| 2004/0066354 | A1 | 4/2004 | Aoki et al. |

(Continued)

FOREIGN PATENT DOCUMENTS

| CN | 101151347 | 3/2008 |
| JP | 3-177491 | 8/1991 |

(Continued)

OTHER PUBLICATIONS

Ryu, et al., "Blue-Luminescence of Nanocrystalline $MWO_4$ (M=Ca, Sr, Ba, Pb) Phosphors Synthesized via a Citrate Complex Route Assisted by Microwave Irradiation", Electrochemical and Solid-State Letters, vol. 8, No. 5, 2005, pp. D15-D18.

*Primary Examiner* — Nimeshkumar Patel
*Assistant Examiner* — Christopher Raabe
(74) *Attorney, Agent, or Firm* — Hamre, Schumann, Mueller & Larson, P.C.

(57) ABSTRACT

The blue phosphor of the present invention is represented by the general formula $aBaO.bSrO.(1-a-b)EuO.cMgO.dAlO_{3/2}.eWO_3$, where $0.70 \leq a \leq 0.95$, $0 \leq b \leq 0.15$, $0.95 \leq c \leq 1.15$, $9.00 \leq d \leq 11.00$, $0.001 \leq e \leq 0.200$, and $a+b \leq 0.97$ are satisfied. In the blue phosphor of the present invention, two peaks whose tops are located in a range of diffraction angle $2\theta=13.0$ to $13.6$ degrees and one peak whose top is located in a range of diffraction angle $2\theta=14.6$ to $14.8$ degrees are present in an X-ray diffraction pattern obtained by measurement on the blue phosphor using an X-ray with a wavelength of 0.774 Å.

8 Claims, 1 Drawing Sheet

(56) References Cited

U.S. PATENT DOCUMENTS

| | | |
|---|---|---|
| 2005/0046330 A1 | 3/2005 | Okuyama et al. |
| 2005/0062417 A1 | 3/2005 | Okuyama et al. |
| 2006/0091360 A1* | 5/2006 | Hirayama et al. ..... 252/301.4 R |
| 2008/0203893 A1 | 8/2008 | Sakai et al. |
| 2010/0052506 A1 | 3/2010 | Okuyama et al. |
| 2010/0237764 A1 | 9/2010 | Okuyama et al. |

FOREIGN PATENT DOCUMENTS

| | | |
|---|---|---|
| JP | 6-029418 B2 | 4/1994 |
| JP | 10-330746 A | 12/1998 |
| JP | 2000-026855 A | 1/2000 |
| JP | 2000-034478 A | 2/2000 |
| JP | 2000-169841 A | 6/2000 |
| JP | 2002-080843 | 3/2002 |
| JP | 2003-082344 A | 3/2003 |
| JP | 2003-147352 A | 5/2003 |
| JP | 2005-314464 | 11/2005 |
| JP | 2005-340155 A | 12/2005 |
| JP | 2006-290974 A | 10/2006 |
| WO | WO 2004/087833 A1 | 10/2004 |
| WO | WO 2008/136170 A1 | 11/2008 |

* cited by examiner

BLUE PHOSPHOR, AND LIGHT-EMITTING DEVICE USING THE SAME

TECHNICAL FIELD

The present invention relates to a blue phosphor that is used in a plasma display panel (hereinafter, referred to as a PDP), a mercury-free fluorescent lamp, or the like, and to a light-emitting device (particularly a PDP) using the blue phosphor.

BACKGROUND ART

Various aluminate phosphors have been put to practical use as phosphors for energy-saving fluorescent lamps. Examples of blue phosphors include $(Ba,Sr)MgAl_{10}O_{17}$:Eu (hereinafter, referred to as BAM:Eu), and examples of green phosphors include $CeMgAl_{11}O_{19}$:Tb and $BaMgAl_{10}O_{17}$:Eu,Mn.

In recent years, BAM:Eu, which exhibits high luminance under vacuum-ultraviolet excitation, has been used as a blue phosphor for PDPs.

However, when a light-emitting device using the blue phosphor BAM:Eu is driven for a long period of time, the luminance is degraded significantly. Hence, for use in a light-emitting device, particularly in a PDP, there is a strong demand for a phosphor that shows less luminance degradation even after long-term driving.

The mechanism of luminance degradation of the blue phosphor BAM:Eu has not been clarified sufficiently. The luminance degradation of the blue phosphor is likely to occur because of the entry of moisture and impurity gas as well as the heat treatment in the process of manufacturing the light-emitting device, and of the vacuum ultraviolet light irradiation during driving of the light-emitting device.

In order to prevent the luminance degradation, there have been proposed a method in which gadolinium is added to a phosphor (see Patent Literature 1, for example), a method in which a phosphor is coated with silicate of divalent metal such as alkaline earth metal (see Patent Literature 2, for example), and a method in which a phosphor is coated with an antimony oxide (see Patent Literature 3, for example). In addition to these methods, there have been suggested phosphors containing blue light emitting components with improved luminance and thereby exhibiting high luminance under vacuum-ultraviolet excitation (see Patent Literatures 4 and 5).

CITATION LIST

Patent Literature

Patent Literature 1: JP 6(1994)-29418 B
Patent Literature 2: JP 2000-34478 A
Patent Literature 3: JP 10(1998)-330746 A
Patent Literature 4: JP 2000-26855 A
Patent Literature 5: JP 2003-147352 A

SUMMARY OF INVENTION

Technical Problem

However, light-emitting devices using the phosphors according to these conventional methods, in most cases, cannot suppress the luminance degradation of the phosphors during driving while maintaining high luminance.

The present invention has been made in order to solve the above-mentioned conventional problem, and it is an object of the present invention to provide a blue phosphor that exhibits high luminance and shows less luminance degradation during driving of a light-emitting device. It is a further object of the present invention to provide a long-life light-emitting device, particularly a PDP, using the blue phosphor.

Solution to Problem

In order to solve the above problem, the blue phosphor of the present invention is a blue phosphor represented by the general formula $aBaO.bSrO.(1-a-b)EuO.cMgO.dAlO_{3/2}.eWO_3$, where $0.70 \leq a \leq 0.95$, $0 \leq b \leq 0.15$, $0.95 \leq c \leq 1.15$, $9.00 \leq d \leq 11.00$, $0.001 \leq e \leq 0.200$, and $a+b \leq 0.97$ are satisfied. In this blue phosphor, two peaks whose tops are located in a range of diffraction angle $2\theta=13.0$ to 13.6 degrees and one peak whose top is located in a range of diffraction angle $2\theta=14.6$ to 14.8 degrees are present in an X-ray diffraction pattern obtained by measurement on the blue phosphor using an X-ray with a wavelength of 0.774 Å.

The present invention further provides a light-emitting device including a phosphor layer containing the above-mentioned blue phosphor of the present invention.

Advantageous Effects of Invention

The present invention can provide a blue phosphor that exhibits high luminance and shows less luminance degradation during manufacturing and driving of the light-emitting device. The present invention also can provide a long-life light-emitting device, such as a PDP, in which the luminance is not degraded even after long-term driving.

DESCRIPTION OF EMBODIMENT

Figure 1:
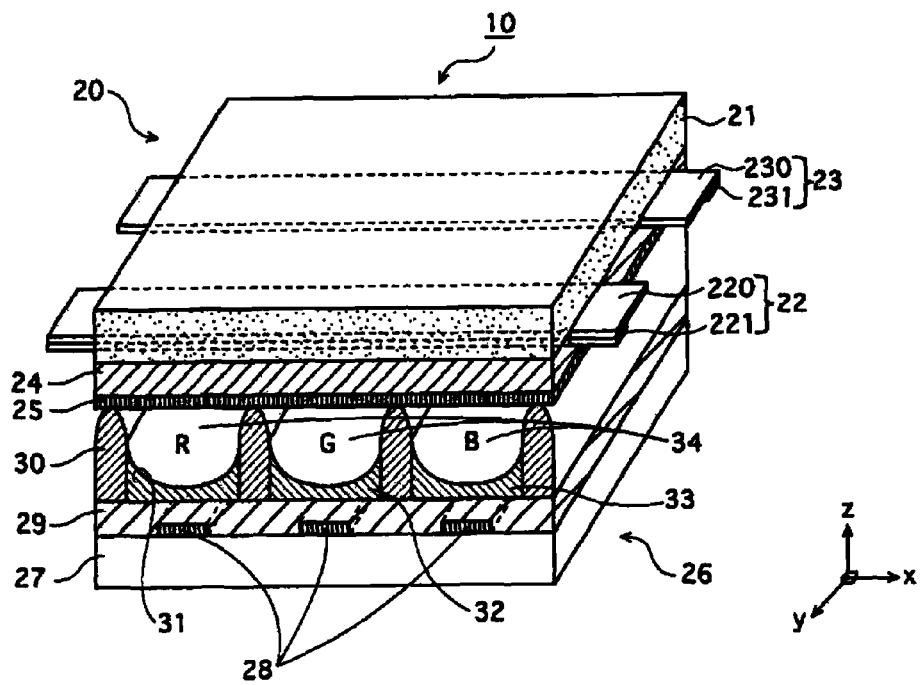
FIG. 1 is a schematic cross-sectional view showing a structure of a PDP, which is one example of a light-emitting device of the present invention.

Hereinafter, an embodiment of the present invention will be described in detail.

<Composition of Blue Phosphor>

The blue phosphor of the present invention is represented by the general formula $aBaO.bSrO.(1-a-b)EuO.cMgO.dAlO_{3/2}.eWO_3$, where $0.70 \leq a \leq 0.95$, $0 \leq b \leq 0.15$, $0.95 \leq c \leq 1.15$, $9.00 \leq d \leq 11.00$, $0.001 \leq e \leq 0.200$, and $a+b \leq 0.97$ are satisfied. With respect to coefficients a, b, c, d and e, preferable ranges are $0.80 \leq a \leq 0.95$, $0 \leq b \leq 0.05$, $1.00 \leq c \leq 1.15$, $9.50 \leq d \leq 10.00$, and $0.005 \leq e \leq 0.040$, respectively.

<Characteristics Relating to X-ray Diffraction of Blue Phosphor>

In the blue phosphor of the present invention, two peaks whose tops are located in a range of diffraction angle $2\theta=13.0$ to 13.6 degrees and one peak whose top is located in a range of diffraction angle $2\theta=14.6$ to 14.8 degrees are present in an X-ray diffraction pattern obtained by measurement on the blue phosphor using an X-ray with a wavelength of 0.774 Å. From the aspects of luminance and resistance to luminance degradation, it is preferable that one of the three peaks has its top in a range of diffraction angle $2\theta=13.0$ to 13.2 degrees in the X-ray diffraction pattern obtained by measurement on the blue phosphor using an X-ray with a wavelength of 0.774 Å.

The present inventors have verified in detail the experimental results and found that a blue phosphor having the above composition and satisfying the above characteristics relating to the X-ray diffraction pattern can be a phosphor that exhibits high luminance and shows less luminance degradation during manufacturing and driving of a light-emitting device. With respect to the conventional blue phosphor BAM:Eu, the number of peaks whose tops are located in the above range (13.0 to 13.6 degrees) of diffraction angle 2θ is only one. The reason why the blue phosphor of the present invention satisfying the above characteristics relating to the X-ray diffraction pattern has excellent light-emitting property is not clear, but it is presumed to be as follows. According to the experiments conducted by the present inventors, in the blue phosphor of the present invention obtained by carrying out firing under unique conditions as described later, its lattice constant changes. Presumably, this change in the lattice constant enhances the light-emitting property (resistance to luminance degradation) of the phosphor.

In the present invention, in order to distinguish a peak from a change in signal intensity due to noise and the like in the X-ray diffraction pattern, among the changes in signal intensity, a change in signal intensity having an intensity of at least one tenth of a peak present in the vicinity of a diffraction angle 2θ=13.4 degrees is recognized as a peak. In the present invention, the phrase "two peaks are present" refers to the case where the sign of the differential value at each angle point constituting the spectrum is reversed three times within a predetermined range of diffraction angle, while ignoring noise. Therefore, here, even in the case where two peaks overlap so as to constitute one bimodal peak, it is considered that "two peaks are present".

<Powder X-ray Diffraction Measurement>

Next, a powder X-ray diffraction measurement for obtaining the X-ray diffraction pattern of the blue phosphor of the present invention will be described.

For the powder X-ray diffraction measurement, for example, BL19B2 powder X-ray diffraction equipment (Debye-Scherrer optical system using an imaging plate; hereinafter referred to as BL19 diffraction equipment) in the large-scale synchrotron radiation facility, SPring 8 is used. Phosphor powder is packed tightly into a Lindemann glass capillary with an internal diameter of 200 μm. The incident X-ray wavelength is set to approximately 0.774 Å using a monochromator. While a sample is rotated with a goniometer, the diffraction intensity is recorded on the imaging plate. The measuring time is to be determined, taking care to keep the imaging plate unsaturated. The measuring time is, for example, 5 minutes. The imaging plate is developed and an X-ray diffraction spectrum thereon is read out.

It should be noted that an error from the zero point when the data is read out from the developed imaging plate is approximately 0.03 degrees in terms of diffraction angle 2θ.

An accurate incident X-ray wavelength is confirmed using a $CeO_2$ powder (SRM No. 674a) of NIST (National Institute of Standards and Technology) whose lattice constant is 5.4111 Å. The data measured on the $CeO_2$ powder is subjected to Rietveld analysis while varying only the lattice constant (a-axis length). The actual X-ray wavelength λ is calculated based on the difference between the value a' obtained for the predetermined X-ray wavelength λ' and the actual value (a=5.4111 Å) from the following formula.

$$\lambda = a\lambda'/a'$$

For the Rietveld analysis, RIETAN-2000 program (Rev. 2.3.9 or later; hereinafter referred to as RIETAN) is used (see NAKAI Izumi, IZUMI Fujio, "Funmatsu X-sen kaiseki-no-jissai—Rietveld hou nyumon" (Practice of powder X-ray analysis—introduction to Rietveld method), Discussion Group of X-Ray Analysis, the Japan Society for Analytical Chemistry, Asakura Publishing, 2002, and http://homepage.mac.com/fujioizumi/).

It should be noted that X-ray diffraction is a phenomenon that is observed when a crystal lattice, incidence of X-ray, and a geometry of diffraction satisfy the Bragg's condition:

$$2d \sin \theta = n\lambda$$

Though the spectrum can be observed using a commonly available X-ray diffractometer, the diffraction profile observed has some differences because the observed spectrum intensity depends on the incident X-ray wavelength.

<Manufacturing Method of Blue Phosphor>

Hereinafter, the method of manufacturing the blue phosphor of the present invention will be described.

The blue phosphor of the present invention can be obtained by firing in a weakly reducing atmosphere and firing in a weakly oxidizing atmosphere. The firing in the weakly oxidizing atmosphere is carried out in the course of temperature drop after the firing in the weakly reducing atmosphere. Specifically, the blue phosphor of the present invention can be obtained in the following manner. In the firing step, the first firing is carried out in a weakly reducing mixed gas containing hydrogen, nitrogen and oxygen, and then, in the course of temperature drop, a firing period (weakly oxidizing mixed gas region) is provided in which the further firing is carried out in a weakly oxidizing mixed gas containing nitrogen and oxygen. Hereinafter, one example of the method of manufacturing the blue phosphor of the present invention will be described.

As a barium source material, a barium compound that can be converted into barium oxide by firing, such as barium hydroxide, barium carbonate, barium nitrate, barium halide, and barium oxalate, each having high purity (purity of 99% or more), may be used. Barium oxide having high purity (purity of 99% or more) also may be used.

As a strontium source material, a strontium compound that can be converted into strontium oxide by firing, such as strontium hydroxide, strontium carbonate, strontium nitrate, strontium halide, and strontium oxalate, each having high purity (purity of 99% or more), may be used. Strontium oxide having high purity (purity of 99% or more) also may be used.

As a europium source material, a europium compound that can be converted into europium oxide by firing, such as europium hydroxide, europium carbonate, europium nitrate, europium halide, and europium oxalate, each having high purity (purity of 99% or more), may be used. Europium oxide having high purity (purity of 99% or more) also may be used.

As a magnesium source material, a magnesium compound that can be converted into magnesium oxide by firing, such as magnesium hydroxide, magnesium carbonate, magnesium nitrate, magnesium halide, magnesium oxalate, and basic magnesium carbonate, each having high purity (purity of 99% or more), may be used. Magnesium oxide having high purity (purity of 99% or more) also may be used.

As an aluminum source material, an aluminum compound that is converted into alumina by firing, such as aluminum hydroxide, aluminum nitrate, and aluminum halide, each having high purity (purity of 99% or more), may be used. Alumina having high purity (purity of 99.9% or more) also may be used.

As a tungsten source material, various source materials that can be converted into oxides by firing may be used in the same way.

The blue phosphor of the present invention is manufactured by mixing the above source materials and firing the mixed powder. The method of mixing the source materials may be wet mixing in a solution or dry mixing of dry powders. A ball mill, a stirred media mill, a planetary mill, a vibration mill, a jet mill, a V-type mixer, an agitator, and the like, which are in general industrial use, may be used. Since coarse particles in the source materials adversely affect the light-emitting property, it is preferable that the particles are classified to improve particle size uniformity.

In manufacturing the blue phosphor of the present invention, the firing of the mixed powder is carried out in a mixed gas containing hydrogen, nitrogen and oxygen at 1200 to 1600° C. for 1 to 50 hours. In the mixed gas, the concentration of hydrogen is 0.1 to 10% by volume and the partial pressure of oxygen is adjusted to approximately $1\times10^{-7}$ to $1\times10^{-2}$ Pa ($1\times10^{-12}$ to $1\times10^{-7}$ atm). Under more preferable conditions, the firing is carried out in a weakly reducing atmosphere, in which the partial pressure of oxygen is adjusted to approximately $1\times10^{-6}$ to $1\times10^{-4}$ Pa ($1\times10^{-11}$ to $1\times10^{-9}$ atm), at 1300 to 1400° C. for 4 hours, and further, in the course of temperature drop, a weakly oxidizing mixed gas region containing nitrogen and oxygen is provided. The partial pressure of oxygen in the weakly oxidizing atmosphere only has to be higher than that in the weakly reducing atmosphere.

As a furnace to be used for the firing, furnaces that are in general industrial use may be used. A gas furnace or an electric furnace of the batch type or continuous type such as a pusher furnace may be used.

When a hydroxide, a carbonate, a nitrate, a halide, an oxalate or the like that can be converted into oxide by firing is used as a source material, it is preferable that pre-firing is carried out within a temperature range of 800 to 1400° C. before main firing. A flux, such as fluoride of an element constituting the blue phosphor, preferably is added in order to accelerate the reaction.

The particle size distribution and flowability of the phosphor powder can be adjusted by crushing the obtained phosphor powder again using a ball mill, a jet mill, or the like, and further by washing or classifying it, if necessary.

<Uses of Blue Phosphor>

A light-emitting device exhibiting high luminance and resistance to luminance degradation can be constructed by applying the blue phosphor of the present invention to a light-emitting device having a phosphor layer. Specifically, for a light-emitting device having a phosphor layer in which BAM:Eu is used, BAM:Eu is replaced with the blue phosphor of the present invention, while a light-emitting device may be constructed according to a known method. Examples of the light-emitting device include a PDP, a fluorescent panel, and a fluorescent lamp, and among them, a PDP is suitable.

Hereinafter, an embodiment (in which the light-emitting device of the present invention is a PDP) in which the blue phosphor of the present invention is applied to a PDP will be described with an example of an AC surface-discharge type PDP. FIG. 1 is a cross-sectional perspective view showing the basic structure of an AC surface-discharge type PDP 10. It should be noted that the PDP shown here is illustrated for convenience with a size that is appropriate for a specification of 1024×768 pixels, which is the 42-inch class, and the present invention may be applied to other sizes and specifications as well.

As illustrated in FIG. 1, this PDP 10 includes a front panel 20 and a back panel 26, and these panels are arranged with their main surfaces facing each other.

This front panel 20 is provided with a pair of electrodes. Specifically, the front panel 20 includes a front panel glass 21 as a front substrate, a pair of strip-shaped display electrodes (X-electrode 23, Y-electrode 22) provided on one main surface of the front panel glass 21, a front-side dielectric layer 24 having a thickness of approximately 30 μm covering the display electrodes, and a protective layer 25 having a thickness of approximately 1.0 μm provided on the front-side dielectric layer 24.

The above display electrode includes strip-shaped transparent electrodes 220 and 230 having a thickness of 0.1 μm and a width of 150 μm, and bus lines 221 and 231 having a thickness of 7 μm and a width of 95 μm and laid on the transparent electrodes 220 and 230 respectively. A plurality of pairs of the display electrodes (X electrodes 23 and Y electrodes 22) are disposed in the y-axis direction, where the x-axis direction is a longitudinal direction.

The display electrodes (X-electrode 23, Y-electrode 22) of each pair are connected electrically to a panel drive circuit (not shown) respectively in the vicinity of the ends of the width direction (y-axis direction) of the front panel glass 21. It should be noted that the Y-electrodes 22 are connected collectively to the panel drive circuit and the X-electrodes 23 each are connected independently to the panel drive circuit. When the Y-electrodes 22 and a specified X-electrode 23 are fed using the panel drive circuit, a surface discharge (sustained discharge) is generated in the gap (approximately 80 μm) between the X-electrode 23 and the Y-electrode 22. The X-electrode 23 also can operate as a scan electrode, and in this case, a write discharge (address discharge) can be generated between the X-electrode 23 and an address electrode 28 to be described later.

The back panel 26 includes a back panel glass 27 as a back substrate, a plurality of address electrodes 28, a back-side dielectric layer 29, barrier ribs 30, and phosphor layers 31 to 33, each of which corresponds to one color of red (R), green (G), and blue (B). The phosphor layers 31 to 33 are provided so that they contact with the side walls of two adjacent barrier ribs 30 and with the back-side dielectric layer 29 between the adjacent barrier ribs 30, and repeatedly are disposed in sequence in the x-axis direction.

The blue phosphor layer (B) contains the above-mentioned blue phosphor of the present invention. On the other hand, the red phosphor layer and the green phosphor layer contain commonly-used phosphors. Examples of the red phosphor include $(Y,Gd)BO_3$:Eu and $Y_2O_3$:Eu, and examples of the green phosphor include $Zn_2SiO_4$:Mn, $YBO_3$:Tb, and $(Y,Gd)BO_3$:Tb.

Each phosphor layer can be formed by applying a phosphor ink in which the corresponding phosphor particles are dispersed to the barrier ribs 30 and the back-side dielectric layer 29 by a known applying method such as a meniscus method and a line jet method, and drying and firing them (e.g., at 500° C., for 10 minutes). For example, when a blue phosphor layer is produced, the above-mentioned phosphor ink can be prepared, for example, by mixing 30% by mass of a blue phosphor, 4.5% by mass of ethyl cellulose with a mass average molecular weight of approximately 200,000, and 65.5% by mass of butyl carbitol acetate.

The address electrodes 28 are provided on one of the main surfaces of the back panel glass 27. The back-side dielectric layer 29 is provided so as to cover the address electrodes 28. The barrier ribs 30 have a height of approximately 150 μm and a width of approximately 40 μm, and the longitudinal direction is in the y-axis direction. The barrier ribs 30 are provided on the back-side dielectric layer 29 so as to correspond to the pitch of the adjacent address electrodes 28.

Each of the address electrodes 28 has a thickness of 5 μm and a width of 60 μm. A plurality of address electrodes 28 are disposed in the x-axis direction, where the y-axis direction is a longitudinal direction. The address electrodes 28 are disposed at a certain pitch (approximately 150 μm). A plurality of address electrodes 28 each are connected independently to the above-mentioned panel drive circuit. Address discharge can be generated between a specified address electrode 28 and a specified X-electrode 23 by feeding each address electrode individually.

The front panel 20 and the back panel 26 are disposed so that the address electrode 28 and the display electrode are orthogonal to each other. The peripheral portions of both the panels 20 and 26 are bonded and sealed with a frit glass sealing portion (not shown) that serves as a sealing member. An enclosed space between the front panel 20 and the back panel 26, which has been bonded and sealed with the fit glass sealing portion, is filled with a discharge gas containing xenon (Xe) (for example, a discharge gas composed of rare gas components such as He and Ne in addition to Xe) at a predetermined pressure (ordinarily approximately $6.7 \times 10^4$ to $1.0 \times 10^5$ Pa).

It should be noted that a space corresponding to a space between two adjacent barrier ribs 30 is a discharge space 34. A region where a pair of display electrodes (X electrode 23, Y electrode 22) intersect with one address electrode 28 with the discharge space 34 disposed therebetween corresponds to a cell used for displaying an image. It should be noted that in this embodiment, the cell pitch in the x-axis direction is set to approximately 300 μm and the cell pitch in the y-axis direction is set to approximately 675 μm.

When the PDP 10 is driven, an address discharge is generated by applying a pulse voltage to the specified address electrode 28 and the specified X-electrode 23 by the panel drive circuit, and after that, a sustained discharge is generated by applying a pulse between a pair of display electrodes (X-electrode 23, Y-electrode 22). The phosphors contained in the phosphor layers 31 to 33 are allowed to emit visible light using the ultraviolet ray with a short wavelength (a resonance line with a central wavelength of approximately 147 nm and a molecular beam with a central wavelength of 172 nm) thus generated. Thereby, a prescribed image can be displayed on the front panel side.

The blue phosphor of the present invention can be applied to a fluorescent panel including a fluorescent layer that is excited by an ultraviolet ray and then emits light. This fluorescent panel has good luminance as well as an excellent resistance to luminance degradation compared to the conventional fluorescent panels. This fluorescent panel can be used, for example, as a backlight of a liquid crystal display device.

The blue phosphor of the present invention can be applied also to a fluorescent lamp (e.g., electrodeless fluorescent lamp) according to a known manner. This fluorescent lamp has good luminance as well as an excellent resistance to luminance degradation compared to the conventional fluorescent lamps.

EXAMPLES

Hereinafter, an embodiment of the present invention will be described in more detail with reference to Examples. The present invention is not limited by these Examples.

<Preparation of Phosphor Samples of Examples>

As starting materials, $BaCO_3$, $SrCO_3$, $MgCO_3$, $Al_2O_3$, $AlF_3$, $Eu_2O_3$, and $WO_3$ were used. These materials were weighed according to the compositions shown in Table 1, and wet-mixed in pure water using a planetary mill (zirconia beads having a diameter of 3 mm). After these mixtures were dried, they were pre-fired in an air atmosphere at 1300° C. for 4 hours. The pre-fired powders were wet-disintegrated in pure water using a planetary mill (zirconia beads having a diameter of 3 mm) so as to adjust the particle size. After these pre-fired powders were dried, they were subjected to main firing at 1400° C. for 4 hours, and thus phosphors (Sample Nos. 4 to 14) were obtained. It should be noted that the main firing was carried out by employing a unique firing method, in which the firing was carried out under a mixed gas atmosphere containing hydrogen, nitrogen and oxygen (in which the concentration of hydrogen was 3% by volume, and the partial pressure of oxygen was approximately $1 \times 10^{-5}$ Pa ($1 \times 10^{-10}$ atm) at a peak temperature), and then, in the course of temperature drop, introduction of hydrogen was stopped at a temperature of 850° C. and further introduction of oxygen was stopped at a temperature of 750° C.

<Preparation of Phosphor Samples of Comparative Examples>

Phosphors of Sample Nos. 1 to 3 and 15 to 20 were prepared in the same manner as in the phosphor samples of Examples (Sample Nos. 4 to 14), except that the main firing was carried out in a typical reducing atmosphere using nitrogen containing 3% by volume of hydrogen (in which the partial pressure of oxygen was approximately $1 \times 10^{-10}$ Pa ($1 \times 10^{-15}$ atm) at a peak temperature).

<Powder X-Ray Diffraction Measurement>

Figure 2:
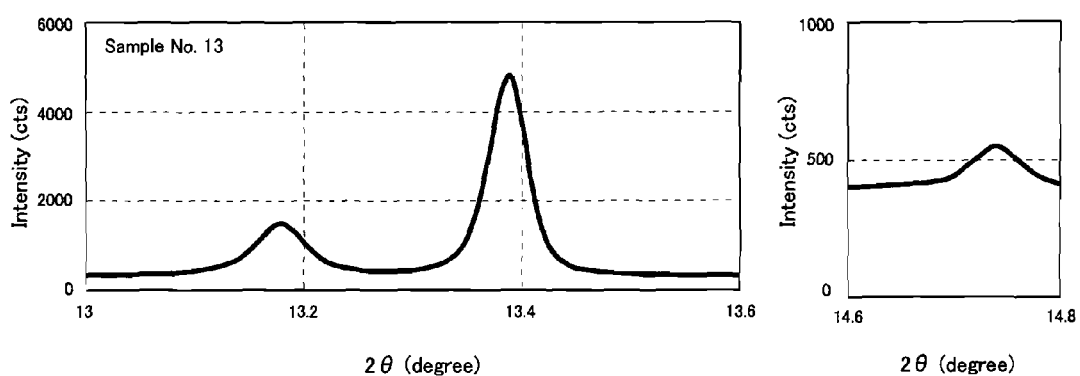
FIG. 2 shows an X-ray diffraction pattern of a powder sample No. 13 obtained by measurement in Examples.

The X-ray diffraction patterns of the phosphor samples of Examples and Comparative Examples were measured by the above-mentioned method, using BL19 diffraction equipment in the large-scale synchrotron radiation facility, SPring 8. Table 1 shows, for respective phosphor samples, the positions of peaks whose tops are located in the range of diffraction angle 2θ=13.0 to 13.6 degrees and 14.6 to 14.8 degrees in the obtained X-ray diffraction patterns, as well as the compositions of the samples. The samples marked with an asterisk in Table 1 are the phosphors of Comparative Examples. FIG. 2 shows an example of the obtained X-ray diffraction pattern (of Samples No. 13).

<Measurement of Luminance>

The measurement of luminance was carried out by irradiating the phosphors with a vacuum ultraviolet ray with a wavelength of 146 nm under vacuum and measuring light-emission in the visible region. The measured luminance, which is luminance Y in the XYZ color coordinate system of International Commission on Illumination, was expressed as a value relative to that of the standard sample BAM:Eu and evaluated. Table 1 shows the results.

TABLE 1

| Sample No. | a | b | c | d | e | Peak position (degrees) | Y (%) |
|---|---|---|---|---|---|---|---|
| *1 | 0.65 | 0.25 | 0.90 | 8.00 | 0 | 13.40 | 70 |
| *2 | 0.70 | 0.20 | 1.00 | 10.00 | 0 | 13.38 | 85 |
| *3 | 0.97 | 0 | 1.20 | 12.00 | 0 | 13.34 | 75 |
| 4 | 0.70 | 0.15 | 0.95 | 9.00 | 0.001 | 13.26, 13.40, 14.73 | 100 |
| 5 | 0.90 | 0.05 | 1.15 | 10.00 | 0.200 | 13.27, 13.42, 14.73 | 102 |
| 6 | 0.90 | 0.05 | 1.15 | 11.00 | 0.010 | 13.28, 13.42, 14.74 | 110 |
| 7 | 0.85 | 0.05 | 1.00 | 9.50 | 0.005 | 13.30, 13.40, 14.73 | 110 |
| 8 | 0.80 | 0.05 | 1.15 | 10.00 | 0.020 | 13.26, 13.42, 14.74 | 117 |
| 9 | 0.90 | 0 | 1.00 | 10.00 | 0.020 | 13.18, 13.40, 14.73 | 123 |
| 10 | 0.90 | 0.02 | 1.15 | 9.70 | 0.020 | 13.16, 13.42, 14.74 | 126 |
| 11 | 0.80 | 0.05 | 1.00 | 9.50 | 0.005 | 13.14, 13.38, 14.75 | 119 |
| 12 | 0.95 | 0 | 1.00 | 10.00 | 0.020 | 13.18, 13.40, 14.72 | 125 |
| 13 | 0.91 | 0 | 1.00 | 10.00 | 0.040 | 13.16, 13.38, 14.74 | 132 |
| 14 | 0.90 | 0 | 1.00 | 9.80 | 0.020 | 13.18, 13.40, 14.73 | 128 |
| *15 | 0.80 | 0.10 | 1.00 | 12.00 | 0 | 13.44 | 88 |
| *16 | 0.80 | 0.10 | 1.00 | 10.00 | 0 | 13.38 | 92 |
| *17 | 0.70 | 0.15 | 0.95 | 9.00 | 0.001 | 13.40, 14.74 | 83 |
| *18 | 0.80 | 0.05 | 1.15 | 10.00 | 0.020 | 13.42 | 95 |
| *19 | 0.90 | 0 | 1.00 | 10.00 | 0.020 | 13.38 | 98 |
| *20 | 0.95 | 0 | 1.00 | 10.00 | 0.020 | 13.40 | 95 |

As is clear from Table 1, phosphors, each having a composition falling within the composition range of the present invention and having two peaks whose tops are located in the range of diffraction angle 2θ=13.0 to 13.6 degrees and one peak whose top is located in the range of diffraction angle 2θ=14.6 to 14.8 degrees, exhibit high luminance under vacuum-ultraviolet excitation. Among them, the phosphors (Sample Nos. 9 to 14) each having peaks, one of which has its top in the range of diffraction angle 2θ=13.0 to 13.2 degrees, exhibit particularly high luminance.

The 42-inch PDP structured as shown in FIG. 1 was produced using each of blue phosphors corresponding to those of Sample Nos. 1 to 20. The initial luminance of the PDP thus produced (as a relative value with respect to that of a PDP using the standard sample BAM:Eu) was measured, and the luminance degradation after accelerated driving (equivalent to 1000 hours of actual driving) of the PDP was obtained. Table 2 shows the results. The sample panels were produced so as to have the same structure as that of the PDP described above in the embodiment. Each of the sample panels, however, displayed a fixed image with one color of blue. The samples marked with an asterisk in Table 2 are the phosphors of Comparative Examples.

TABLE 2

| Sample No. | a | b | c | d | e | Peak position (degrees) | Luminance (%) | Luminance degradation (%) |
|---|---|---|---|---|---|---|---|---|
| *21 | 0.65 | 0.25 | 0.90 | 8.00 | 0 | 13.40 | 62 | 18 |
| *22 | 0.70 | 0.20 | 1.00 | 10.00 | 0 | 13.38 | 80 | 21 |
| *23 | 0.97 | 0 | 1.20 | 12.00 | 0 | 13.34 | 71 | 16 |
| 24 | 0.70 | 0.15 | 0.95 | 9.00 | 0.001 | 13.26, 13.40, 14.73 | 94 | 8 |
| 25 | 0.90 | 0.05 | 1.15 | 10.00 | 0.200 | 13.27, 13.42, 14.73 | 100 | 7 |
| 26 | 0.90 | 0.05 | 1.15 | 11.00 | 0.010 | 13.28, 13.42, 14.74 | 111 | 4 |
| 27 | 0.85 | 0.05 | 1.00 | 9.50 | 0.005 | 13.30, 13.40, 14.73 | 109 | 6 |
| 28 | 0.80 | 0.05 | 1.15 | 10.00 | 0.020 | 13.26, 13.42, 14.74 | 116 | 4 |
| 29 | 0.90 | 0 | 1.00 | 10.00 | 0.020 | 13.18, 13.40, 14.73 | 130 | 6 |
| 30 | 0.90 | 0.02 | 1.15 | 9.70 | 0.020 | 13.16, 13.42, 14.74 | 132 | 3 |
| 31 | 0.80 | 0.05 | 1.00 | 9.50 | 0.005 | 13.14, 13.38, 14.75 | 124 | 2 |
| 32 | 0.95 | 0 | 1.00 | 10.00 | 0.020 | 13.18, 13.40, 14.72 | 130 | 4 |
| 33 | 0.91 | 0 | 1.00 | 10.00 | 0.040 | 13.16, 13.38, 14.74 | 139 | 2 |
| 34 | 0.90 | 0 | 1.00 | 9.80 | 0.020 | 13.18, 13.40, 14.73 | 132 | 2 |
| *35 | 0.80 | 0.10 | 1.00 | 12.00 | 0 | 13.44 | 80 | 14 |
| *36 | 0.80 | 0.10 | 1.00 | 10.00 | 0 | 13.38 | 90 | 15 |
| *37 | 0.70 | 0.15 | 0.95 | 9.00 | 0.001 | 13.40, 14.74 | 88 | 12 |
| *38 | 0.80 | 0.05 | 1.15 | 10.00 | 0.020 | 13.42 | 93 | 12 |
| *39 | 0.90 | 0 | 1.00 | 10.00 | 0.020 | 13.38 | 92 | 10 |
| *40 | 0.95 | 0 | 1.00 | 10.00 | 0.020 | 13.40 | 90 | 10 |

As is clear from Table 2, it is confirmed that when phosphors, each having a composition falling within the composition range of the present invention and having two peaks whose tops are located in the range of diffraction angle 2θ=13.0 to 13.6 degrees and one peak whose top is located in the range of diffraction angle 2θ=14.6 to 14.8 degrees, are used, the values of the panel initial luminance are high and luminance degradation is inhibited significantly. When the phosphors (Sample Nos. 29 to 34) each having peaks, one of which has its top in the range of diffraction angle 2θ=13.0 to 13.2 degrees, are used, the panels have particularly high luminance.

In contrast, when the samples of Comparative Examples, in which at least one of the coefficients a, b, c, d and e or the number of peaks whose tops are located in the ranges of diffraction angle 2θ=13.0 to 13.6 degrees and 14.6 to 14.8 degrees in the powder X-ray diffraction measurement is outside the respective ranges specified in the present invention, are used, the values of the initial luminance are low and the luminance is degraded significantly during driving of the PDP.

INDUSTRIAL APPLICABILITY

The blue phosphor of the present invention can be used in light-emitting devices, among them in particular, PDPs. Furthermore, the blue phosphor of the present invention also can be applied to the uses of fluorescent lamps such as an electrodeless fluorescent lamp, fluorescent panels mainly used for a backlight of a liquid crystal display device, and the like.

The invention claimed is:

1. A blue phosphor represented by the general formula $aBaO \cdot bSrO \cdot (1-a-b)EuO \cdot cMgO \cdot dAlO_{3/2} \cdot eWO_3$, where $0.70 \leq a \leq 0.95$, $0 \leq b \leq 0.15$, $0.95 \leq c \leq 1.15$, $9.00 \leq d \leq 11.00$, $0.001 \leq e \leq 0.200$, and $a+b \leq 0.97$ are satisfied, wherein two peaks whose tops are located in a range of diffraction angle 2θ=13.0 to 13.6 degrees and one peak whose top is located in a range of diffraction angle 2θ=14.6 to 14.8 degrees are present in an X-ray diffraction pattern obtained by measurement on the blue phosphor using an X-ray with a wavelength of 0.774 Å.

2. The blue phosphor according to claim 1, wherein $0.80 \leq a \leq 0.95$, $0 \leq b \leq 0.05$, $1.00 \leq c \leq 1.15$, $9.50 \leq d \leq 10.00$, and $0.005 \leq e \leq 0.040$ are satisfied.

3. The blue phosphor according to claim 1, wherein one of the three peaks has its top in a range of diffraction angle 2θ=13.0 to 13.2 degrees in the X-ray diffraction pattern obtained by measurement on the blue phosphor using an X-ray with a wavelength of 0.774 Å.

4. The blue phosphor according to claim 1, wherein
the blue phosphor is obtained by firing in a weakly reducing atmosphere and firing in a weakly oxidizing atmosphere, and
the firing in the weakly reducing atmosphere is carried out at a temperature ranging from 1200 to 1600° C., and the firing in the weakly oxidizing atmosphere is carried out in the course of temperature drop.

5. The blue phosphor according to claim 4, wherein the weakly reducing atmosphere has a partial pressure of oxygen of $1 \times 10^{-6}$ to $1 \times 10^{-4}$ Pa.

6. A light-emitting device comprising a phosphor layer containing the blue phosphor according to claim 1.

7. The light-emitting device according to claim 6, which is a plasma display panel.

8. The light-emitting device according to claim 7, wherein the plasma display panel comprises:

a front panel;

a back panel that is arranged to face the front panel;

barrier ribs that define a clearance between the front panel and the back panel;

a pair of electrodes that are disposed on the back panel or the front panel;

an external circuit that is connected to the pair of electrodes;

a discharge gas that is present at least between the pair of electrodes and contains xenon that generates a vacuum ultraviolet ray by applying a voltage between the pair of electrodes through the external circuit; and phosphor layers that emit visible light induced by the vacuum ultraviolet ray, and the phosphor layers include a blue phosphor layer, and the blue phosphor layer contains the blue phosphor.

\* \* \* \* \*